US009636742B2

(12) United States Patent
Joke et al.

(10) Patent No.: US 9,636,742 B2
(45) Date of Patent: May 2, 2017

(54) BINDER COMPOSITION FOR MAKING FOUNDRY MOLDS

(71) Applicant: KAO CORPORATION, Tokyo (JP)

(72) Inventors: Takashi Joke, Toyohashi (JP); Toshiki Matsuo, Toyohashi (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 14/387,111

(22) PCT Filed: Mar. 12, 2013

(86) PCT No.: PCT/JP2013/057575
§ 371 (c)(1),
(2) Date: Sep. 22, 2014

(87) PCT Pub. No.: WO2013/141186
PCT Pub. Date: Sep. 26, 2013

(65) Prior Publication Data
US 2015/0083358 A1    Mar. 26, 2015

(30) Foreign Application Priority Data

Mar. 23, 2012  (JP) ................. 2012-067554

(51) Int. Cl.
| | | |
|---|---|---|
| *B22C 1/22* | (2006.01) | |
| *C08K 5/00* | (2006.01) | |
| *C08K 5/1535* | (2006.01) | |
| *C08K 5/21* | (2006.01) | |
| *C08L 71/14* | (2006.01) | |
| *B22C 1/18* | (2006.01) | |
| *C08G 65/48* | (2006.01) | |

(52) U.S. Cl.
CPC ............ *B22C 1/224* (2013.01); *B22C 1/181* (2013.01); *B22C 1/2233* (2013.01); *B22C 1/2246* (2013.01); *B22C 1/2253* (2013.01); *C08G 65/48* (2013.01); *C08K 5/0025* (2013.01); *C08K 5/1535* (2013.01); *C08K 5/21* (2013.01); *C08L 71/14* (2013.01)

(58) Field of Classification Search
CPC ............................. B22C 1/2233; B22C 1/224
See application file for complete search history.

(56) References Cited

U.S. PATENT DOCUMENTS

| | | |
|---|---|---|
| 2008/0045692 A1 | 2/2008 | Sawa |
| 2008/0207795 A1 | 8/2008 | Henry et al. |
| 2008/0207796 A1 | 8/2008 | Clingerman et al. |

FOREIGN PATENT DOCUMENTS

| | | | |
|---|---|---|---|
| CN | 102105241 A | 6/2011 | |
| GB | 1075619 A | * 7/1967 | ............... B22C 1/22 |
| JP | 4-327336 A | 11/1992 | |
| JP | 2006-70247 A | 3/2006 | |
| JP | 2008-23529 A | 2/2008 | |
| JP | 2011-245487 A | 12/2011 | |

OTHER PUBLICATIONS

International Preliminary Report on Patentability, and Written Opinion of the International Searching Authority, dated Oct. 2, 2014 for International Application No. PCT/JP2013/057575 (Forms PCT/IB/326, PCT/IB/373 and PCT/ISA/237).
International Search Report, issued in PCT/JP2013/057575, dated Jun. 14, 2013.

\* cited by examiner

*Primary Examiner* — Vickey Nerangis
(74) *Attorney, Agent, or Firm* — Birch, Stewart, Kolasch & Birch, LLP

(57) ABSTRACT

A binder composition for making foundry molds, comprising an acid-hardening resin, one or more 5-position-substituted-furfural compounds selected from the group consisting of 5-hydroxymethylfurfural and 5-acetoxymethylfurfural, and one or more compounds selected from the group consisting of urea and derivatives of urea, wherein the content of the 5-position-substituted-furfural compound(s) by percentage is from 1 to 60% by weight of the binder composition. The content of the compound(s) by percentage selected from the group consisting of urea and derivatives of urea is preferably from 0.3 to 10% by weight of the binder composition.

14 Claims, No Drawings

BINDER COMPOSITION FOR MAKING FOUNDRY MOLDS

TECHNICAL FIELD

The present invention relates to a binder composition for making foundry, molds.

BACKGROUND OF THE INVENTION

Acid-hardening self-hardening molds are each produced by: adding, to refractory particles such as silica sand, a binder for making foundry molds containing an acid-hardening resin, and a hardener including phosphoric acid, an organic sulfonic acid, sulfuric acid or some other acid; mixing and kneading these components; filling the resultant kneaded sand composition into an original pattern such as a wooden pattern; and then hardening the acid-hardening resin. As the acid-hardening resin, for example, a furan resin, a phenolic resin or the like is used. As the furan resin, for example, the following is used: furfuryl alcohol, furfuryl alcohol/urea-formaldehyde resin, furfuryl alcohol/formaldehyde resin, furfuryl alcohol/phenol/formaldehyde resin, or some other known modified furan resin.

An important requirement for producing a mold is an improvement in the working environment where the mold is produced (when the resin is being hardened). In the case of using, particularly, a furan resin as the acid-hardening resin, it is desired to decrease the amount of formaldehyde generated in the production of the mold. Disclosed is, for example, a method of using a furan-modified urea resin to produce a resin for a self-hardening mold, having excellent storage stability and strength properties without generating much formaldehyde odor (Patent Document 1).

It is disclosed that, for example, 5-hydroxymethylfurfural as an alternative compound to furfuryl alcohol is used as a binder composition which does not substantially contain phenol, formaldehyde nor nitrogen (meaning any amine-containing component such as urea) to decrease harmful substances or gases, thus making it possible to improve the working environment (Patent Document 2).

PATENT DOCUMENTS

Patent Document 1: JP-A-2006-70247
Patent Document 2: US 20080207796

SUMMARY OF THE INVENTION

The present invention relates to a binder composition for making foundry molds which include an acid-hardening resin, one or more 5-position-substituted-furfural compound (s) selected from the group consisting of 5-hydroxymethylfurfural and 5-acetoxymethylfurfural, and one or more compounds selected from the group consisting of urea and derivatives of urea, wherein the content of the 5-position-substituted-furfural compound (s) by percentage is from 1 to 60% by weight of the binder composition; and a composition for a mold using this binder composition.

DETAILED DESCRIPTION OF THE INVENTION

In order to improve the productivity of molds, a binder which improves the hardening rate of the molds and provides a good final strength to the molds is described.

However, binder compositions that have been hitherto suggested are insufficient in the hardening rate and the mold-strength.

From the viewpoint of an improvement in the working environment when a mold is being produced (when an acid-hardening resin therefor is being hardened), the amount of formaldehyde generated has been actually required to be further decreased during the production of the mold. Even if binder composition does not substantially contain formaldehyde, it is well known that formaldehyde generates by the reaction between the methylol group of furfuryl alcohol and the one of another furfuryl alcohol in the mold hardening reaction. Such formaldehyde generated also has been required to be decreased.

The present invention provides a binder composition for making foundry molds capable of improving the hardening rate and the strength of the mold, and further decreasing the amount of formaldehyde generated when the mold is being produced; and a composition for a mold using this binder composition.

The binder composition for making foundry molds of the present invention is a binder composition for making foundry molds including an acid-hardening resin, one or more 5-position-substituted-furfural compound(s) selected from the group consisting of 5-hydroxymethylfurfural and 5-acetoxymethylfurfural, and one or more compounds selected from the group consisting of urea and derivatives of urea, wherein the content by percentage of the 5-position-substituted-furfural compound(s) is from 1 to 60% by weight.

The composition for a mold of the present invention is a composition wherein the following are mixed with each other: refractory particles; the binder composition for making foundry molds; and a hardener for hardening the binder composition for making foundry molds.

The binder composition for making foundry molds of the present invention can improve the hardening rate and the mold-strength. The binder composition for making foundry molds of the present invention can also decrease the amount of formaldehyde generated when the mold is being produced, thus making it possible to make a remarkable improvement in the working environment during the production of the mold. Furthermore, the composition for a mold of the present invention improves the hardening rate and the mold-strength to improve the productivity of molds.

The binder composition of the present invention for making foundry molds (hereinafter also referred to merely as the "binder composition") is a composition which is used as a binder when a mold is being produced, and includes an acid-hardening resin, one or more 5-position-substituted-furfural compound(s) selected from the group consisting of 5-hydroxymethylfurfural and 5-acetoxymethylfurfural, and one or more compounds selected from the group consisting of urea and derivatives of urea, wherein the content by percentage of the 5-position-substituted-furfural compound(s) is from 1 to 60% by weight. The binder composition of the present invention produces advantageous effects of making it possible to improve the hardening rate and strength of the mold and further decrease the amount of formaldehyde generated when the mold is being produced. Although the reason why such advantageous effects are produced is unclear, the reason may be as follows.

Conventionally, when an acid-hardening resin, such as furfuryl alcohol, is hardened by way of condensation reaction in the production of a mold, a large amount of formaldehyde is produced as a byproduct. This results in deterioration in the working environment. However, for the binder composition of the present invention, it is presumed that the rate of reaction between an aldehyde group of the 5-position-substituted-furfural compound and one or more compounds selected from the group consisting of urea and derivatives of urea is specifically larger than that of the reaction between any other furan resin moiety (a methylol group of furfuryl alcohol) and one or more compounds selected from the group consisting of urea and derivatives of urea. Thus, the mold-hardening rate would increase. Formaldehyde is generated by the condensation of furfuryl alcohol; it is presumed that, particularly, a product obtained from the reaction between the 5-position-substituted-furfural compound and one or more compounds selected from the group consisting of urea and derivatives of urea reacts more easily with formaldehyde than simple compounds selected from the group consisting of urea and derivatives of urea. Thus, the amount of formaldehyde generated during the production of the mold would decrease. 5-Acetoxymethylfurfural would act on the hardener to be hydrolyzed to 5-hydroxymethylfurfural, which would contribute to respective improvements in the hardening rate and the strength of the mold.

Hereinafter, a description will be made about the components contained in the binder composition of the present invention.

[Binder Composition for Making Foundry Molds]

<One or More 5-Position-Substituted-Furfural Compounds Selected from the Group Consisting of 5-Hydroxymethylfurfural and 5-Acetoxymethylfurfural>

From the viewpoint of respective improvements in the hardening rate and the mold-strength, the binder composition of the present invention contains one or more 5-position-substituted-furfural compound(s) selected from the group consisting of 5-hydroxymethylfurfural and 5-acetoxymethylfurfural.

From the viewpoint of respective improvements in the hardening rate and the mold-strength, and a decrease in the amount of formaldehyde generated, the 5-position-substituted-furfural compound(s) is/are contained in a proportion of 1 to 60% by weight, and preferably 5 to 55% by weight of the binder composition. From the viewpoint of an improvement in the mold-strength, the 5-position-substituted-furfural compound(s) is/are contained more preferably in a proportion of 10 to 40% by weight of the binder composition. From the viewpoint of an improvement in the hardening rate, the 5-position-substituted-furfural compound(s) is/are contained more preferably in a proportion of 20 to 50% by weight of the binder composition. When these viewpoints are considered in its entirety, the 5-position-substituted-furfural compound(s) is/are contained preferably in a proportion of 20 to 40% by weight, more preferably 25 to 35% by weight of the binder composition.

From the viewpoint of respective improvements in the hardening rate and the mold-strength, and a decrease in the amount of formaldehyde generated, 5-hydroxymethylfurfural is preferred as the 5-position-substituted-furfural compound(s).

From the viewpoint of respective improvements in the hardening rate and the mold-strength, and a decrease in the amount of formaldehyde generated, 5-hydroxymethylfurfural is contained in a proportion of 1 to 60% by weight, preferably 5 to 55% by weight of the binder composition. From the viewpoint of an improvement in the mold-strength, 5-hydroxymethylfurfural is contained more preferably in a proportion of 10 to 40% by weight of the binder composition. From the viewpoint of an improvement in the hardening rate, 5-hydroxymethylfurfural is contained more preferably in a proportion of 20 to 50% by weight of the binder composition. When these viewpoints are considered in its entirety, 5-hydroxymethylfurfural is contained preferably in a proportion of 20 to 40% by weight, more preferably 25 to 35% by weight of the binder composition.

<One or More Compounds Selected from the Group Consisting of Urea and Derivatives of Urea>

From the viewpoint of respective improvements in the hardening rate and the mold-strength, and a decrease in the amount of formaldehyde generated, the binder composition of the present invention contains one or more compounds selected from the group consisting of urea and derivatives of urea together with the 5-position-substituted-furfural compound(s).

One or more compounds selected from the group consisting of urea and derivatives of urea in the binder composition of the present invention is a species of compounds selected from the group consisting of urea and derivatives of urea that has not undergone any condensation reaction with formaldehyde, furfuryl alcohol or the like, and may be either species remaining as an unreactive portion, or a separately added species. The derivatives of urea that has not undergone any condensation reaction with aldehyde like formaldehyde, furfuryl alcohol or the like is selected from the group consisting of alkylene ureas, alkyl ureas, cyclohexyl ureas, aryl ureas, hydroxyalkyl ureas having two or more carbon atoms in the alkyl group, and azodicarbonamide. From the viewpoint of respective improvements in the hardening rate and the mold-strength, and a decrease in the amount of formaldehyde generated for the present invention, one or more compounds selected from the group consisting of urea and derivatives of urea is/are contained preferably in a proportion of 0.3 to 10% by weight, more preferably 0.5 to 9% by weight of the binder composition. From the viewpoint of an improvement in the mold-strength, one or more compounds selected from the group consisting of urea and derivatives of urea is contained even more preferably in a proportion of 0.6 to 6% by weight of the binder composition. From the viewpoint of an improvement in the hardening rate, one or more compounds selected from the group consisting of urea and derivatives of urea is contained even more preferably in a proportion of 1.0 to 8% by weight of the binder composition. When these viewpoints are considered in its entirety, one or more compounds selected from the group consisting of urea and derivatives of urea is contained preferably in a proportion of 1.0 to 6% by weight, more preferably 1.5 to 4.5% by weight of the binder composition.

One or more compounds selected from the group consisting of urea and derivatives of urea in the binder composition may be measured by an LC/MS analyzing operation as described below. A sample therefor is prepared by diluting the composition 100 times with a mixed solution of acetone and water (=50/50), and further diluting the resultant 100 times with a mobile phase.

<LC/MS Analyzing Operation>

Column: Unison UK-Amino HT

Mobile phase: 0.1% TFA acetonitrile/water=95/5

Flow rate: 0.2 mL/min

Column temperature: 40° C.

MS: SIM m/z: 61.0 [M+H]+

From the viewpoint of respective improvements in the hardening rate and the mold-strength of the present invention, the ratio by weight of the 5-position-substituted-furfural compound to the compounds selected from the group consisting of urea and derivatives of urea (the 5-position-substituted-furfural-compound/compounds selected from the group consisting of urea and derivatives of urea ratio) is preferably from 3 to 40, more preferably from 7 to 17.

From the viewpoint of respective improvements in the hardening rate and the mold-strength of the present invention, the ratio by weight of 5-hydroxymethylfurfural to compounds selected from the group consisting of urea and derivatives of urea (the 5-hydroxymethylfurfural/compounds selected from the group consisting of urea and derivatives of urea ratio) is preferably from 3 to 40, more preferably from 7 to 17.

In the present invention, the examples of the compounds selected from the group consisting of urea and derivatives of urea include urea; alkylene ureas such as ethylene urea, propylene urea, butylene urea, hydantoin and the like; alkyl ureas such as methyl urea, 1,1-dimethyl urea, 1,3-dimethyl urea and the like; cyclohexyl ureas such as cyclohexyl urea, 1,3-dicyclohexyl urea and the like; aryl ureas such as phenyl urea, 1,1-diphenyl urea, 1,3-diphenyl urea and the like; hydroxyalkyl ureas having two or more carbon atoms in the alkyl group such as 2-hydroxyethyl urea and the like; azodicarbonamide and the like. These compounds can be used alone and in combination thereof. From the viewpoint of respective improvements in the hardening rate and the mold-strength, and a decrease in the amount of formaldehyde generated, urea and ethylene urea are preferable, and urea is more preferable from the viewpoint of economic efficiency.

<Acid-Hardening Resin>

As the acid-hardening resin, any resin known in the prior art may be used. The resin may be, for example, one selected from the group consisting of furfuryl alcohol, any condensate from furfuryl alcohol, any condensate from furfuryl alcohol and an aldehyde, any condensate from furfuryl alcohol, urea and an aldehyde, any condensate from a phenolic compound and an aldehyde, any condensate from melamine and an aldehyde, and any condensate from urea and an aldehyde, or any mixture composed of two or more selected from this group. The resin may be a co-condensate composed of two or more selected from this group. Of these examples, from the viewpoint of respective improvements in the hardening rate and the mold-strength, preferred are one or more selected from furfuryl alcohol, any condensate from furfuryl alcohol, any condensate from a phenolic compound and an aldehyde, and any condensate from furfuryl alcohol, urea and an aldehyde, and co-condensates of these preferred examples. Furfuryl alcohol can be produced from plants, which are non-petroleum resources; thus, it is preferred to use furfuryl alcohol from the viewpoint of the global environment.

From the viewpoint of an improvement in the mold-strength of the present invention, the acid-hardening resin is contained preferably in a proportion of 10 to 98% by weight, more preferably 25 to 95% by weight, even more preferably 40 to 90% by weight, even more preferably 50 to 85% by weight, even more preferably 60 to 75% by weight of the binder composition.

Examples of furfuryl alcohol include furfuryl alcohol blended alone, and furfuryl alcohol used as a solvent so as to remain in the form of a monomer at the time of synthesizing for example, any condensate made from furfuryl alcohol and an aldehyde any condensate made from furfuryl alcohol, urea and an aldehyde and the like. Furfuryl alcohol is contained preferably in a proportion of 10 to 98% by weight, more preferably 25 to 95% by weight, even more preferably 40 to 90% by weight, even more preferably 50 to 95% by weight, even more preferably from 70 to 90% by weight of the binder composition from the viewpoint of the handling ability by adjusting the viscosity into an appropriate value.

<Hardening Promoter>

The binder composition of the present invention may contain a hardening promoter from the viewpoint of respective improvements in the hardening rate and the mold-strength. The hardening promoter may be a hardening promoter contained in the binder composition. The hardening promoter may be a hardening promoter added separately to the binder composition for a mold. From the viewpoint of respective improvements in the hardening rate and the mold-strength, the hardening promoter is preferably one or more selected from the group consisting of compounds each represented by the following general formula (I) (hereinafter one or more of the compound(s) will be referred to as the hardening promoter (s) (1)), polyhydric phenols, and aromatic dialdehydes:

[Formula 1]

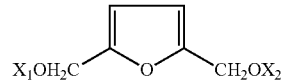

(1)

wherein $X_1$ and $X_2$ each represents a hydrogen atom, $CH_3$ or $C_2H_5$.

Examples of the hardening promoter (s) (1) include 2,5-bis(hydroxymethyl) furan, 2,5-bis(methoxymethyl) furan, 2,5-bis(ethoxymethyl)furan, 2-hydroxymethyl-5-methoxymethylfuran, 2-hydroxymethyl-5-ethoxymethylfuran, and 2-methoxymethyl-5-ethoxymethylfuran. Of these examples, 2,5-bis(hydroxymethyl)furan is preferred from the viewpoint of an improvement in the mold-strength. The content by percentage of the hardening promoter(s) (1) in the binder composition is preferably from 0.5 to 30% by weight, more preferably from 1 to 20% by weight, even more preferably from 2 to 10% by weight, even more preferably from 3 to 6% by weight from the viewpoint of the solubility of the hardening promoter (s) (1) in the furan resin, and respective improvements in the hardening rate and the mold-strength.

From the viewpoint of respective improvements in the hardening rate and the mold-strength, the content by percentage of 2,5-bis(hydroxymethyl)furan is preferably from 0.5 to 30% by weight, more preferably from 1 to 20% by weight, even more preferably from 2 to 10% by weight, even more preferably from 3 to 6% by weight of the binder composition.

Examples of the above-mentioned polyhydric phenolic compounds include resorcin, cresol, hydroquinone, phloroglucinol, methylenebisphenol, condensed tannins, hydrolyzed tannins or the like. Of these examples, resorcin is preferred from the viewpoint of an improvement in the mold-strength. The content by percentage of one or more of the polyhydric phenolic compounds in the binder composition is preferably from 1 to 25%, more preferably from 2 to 15%, even more preferably from 3 to 10% by weight from the viewpoint of the solubility of the polyhydric phenolic compound(s) in the furan resin, and an improvement in the mold-strength. When resorcin is used from these examples, the resorcin content by percentage in the binder composition is preferably from 1 to 10% by weight, more preferably from 2 to 7% by weight, even more preferably from 3 to 6% by weight of the binder composition from the viewpoint of the solubility of resorcin in the furan resin, and an improvement in the final strength of the mold.

<Water>

The binder composition of the present invention may further contain water. In the case of synthesizing a condensate that may be of various types, such as a condensate made from furfuryl alcohol and an aldehyde, a raw material in the form of an aqueous solution, or condensation water is generated so that the condensate is usually yielded in the form of a mixture of the condensate and water. When such a condensate is used in the binder composition, it is unnecessary that the water originating from the process of the synthesis should be removed. For changing the viscosity of the binder composition for easy handling or for some other purpose, water may be further added thereto. However, if the water content becomes excessive, it is feared that the hardening reaction of the acid-hardening resin is hindered. Thus, the water content by percentage of the binder composition ranges preferably from 5 to 30% by weight. In order to improve the handling ability of the binder composition and maintain the hardening reaction rate, the content ranges preferably from 0.5 to 5% by weight, even more preferably from 0.6 to 3.5% by weight, even more preferably from 0.6 to 2.0% by weight.

<Other Additives>

The binder composition may contain therein additives such as a silane coupling agent. When the composition contains, for example, a silane coupling agent, the strength of the resultant mold can be favorably improved. Usable examples of the silane coupling agent include aminosilanes such as N-β-(aminoethyl)-γ-aminopropylmethyldimethoxysilane, N-β-(aminoethyl)-γ-aminopropyltrimethoxysilane, N-β-(aminoethyl)-γ-aminopropyltriethoxysilane, 3-aminopropyltrimethoxysilane and the like; epoxysilanes such as 3-glycidoxypropyltrimethoxysilane, 3-glycidoxypropyltriethoxysilane, 3-glycidoxypropylmethyldiethoxysilane, 3-glycidoxypropyltriethoxysilane and the like; ureidosilanes, mercaptosilanes, sulfidesilanes, methacryloxysilanes, and acryloxysilanes. Preferred are aminosilanes, epoxysilanes and ureidosilanes. More preferred are aminosilanes, and epoxysilanes. Even more preferably are aminosilanes. Among aminosilanes, preferred is N-β-(aminoethyl)-γ-aminopropylmethyldimethoxysilane. The content by percentage of the silane coupling agent in the binder composition is preferably from 0.01 to 0.5%, more preferably from 0.05 to 0.3% by weight from the viewpoint of the mold-strength.

[Composition for a Mold]

The binder composition of the present invention may be mixed with refractory particles and a hardener to prepare a composition for a mold. The composition for a mold of the present invention includes the binder composition of the present invention, refractory particles and a hardener.

The refractory particles may be particles known in the prior art, such as silica sand, chromite sand, Zircon sand, olivine sand, alumina sand, mullite sand, synthetic mullite sand and the like. The particles may be particles obtained by collecting used refractory particles, or subjecting the used particles to regenerating treatment, or other particles.

The hardener is a hardener for hardening the binder composition of the present invention. Specific examples thereof include sulfonic acid based compounds such as xylenesulfonic acid (particularly, m-xylenesulfonic acid), toluenesulfonic acid (particularly, p-toluenesulfonic acid) and the like; phosphoric acid based compounds; sulfuric acid and the like. These compounds are preferably in the form of an aqueous solution from the viewpoint of handling ability. It is allowable to incorporate, into the hardener, one or more solvents selected from the group consisting of alcohols, ether alcohols and esters, and a carboxylic acid.

In the composition for a mold of the present invention, the ratio between the refractory particles, the binder composition and the hardener may be appropriately set. From the viewpoint of respective improvements in the hardening rate and the mold-strength, it is preferred that the respective amounts of the binder composition and the hardener are from 0.5 to 1.5 parts by weight and from 0.07 to 1 part by weight, respectively, for 100 parts by weight of the refractory particles. In connection with the ratio by weight between the binder composition and the hardener, the amount of the hardener is preferably from 20 to 60 parts by weight for 100 parts by weight of the binder composition, more preferably from 30 to 50 parts by weight therefor from the viewpoint of respective improvements in the hardening rate and the mold-strength.

[Method for Producing a Mold]

By hardening the composition for a mold of the present invention, a mold can be produced. In the method for producing a mold of the present invention, the mold may be produced using a conventional mold-producing process as is.

The composition of the present invention is: <1> a binder composition for making foundry molds, including an acid-hardening resin, one or more 5-position-substituted-furfural compounds selected from the group consisting of 5-hydroxymethylfurfural and 5-acetoxymethylfurfural, and one or more compounds selected from the group consisting of urea and derivatives of urea, wherein the content by percentage of the 5-position-substituted-furfural compound(s) is from 1 to 60% by weight.

Furthermore, the present invention is preferably the following composition, production method, or use.

<2> The binder composition for making foundry molds according to item <1>, wherein the content by percentage of the 5-position-substituted-furfural compound(s) is preferably from 5 to 55% by weight, more preferably from 10 to 40% by weight, even more preferably from 20 to 50% by weight, even more preferably from 20 to 40% by weight, even more preferably from 25 to 35% by weight.

<3> The binder composition for making foundry molds according to item <1> or <2>, wherein the content by percentage of the compounds selected from the group consisting of urea and derivatives of urea is preferably from 0.3 to 10% by weight, more preferably from 0.5 to 9% by weight, even more preferably from 1.0 to 8% by weight, even more preferably from 0.6 to 6% by weight, even more preferably from 1.0 to 6% by weight, even more preferably from 1.5 to 4.5% by weight.

<4> The binder composition for making foundry molds according to any one of items <1> to <3>, wherein the ratio by weight of the 5-position-substituted-furfural compound(s) to the compounds selected from the group consisting of urea and derivatives of urea is preferably from 3 to 40, more preferably from 7 to 17.

<5> The binder composition for making foundry molds according to any one of items <1> to <4>, wherein the content by percentage of the acid-hardening resin is from preferably 10 to 98% by weight, more preferably from 25 to 95% by weight, even more preferably from 40 to 90% by weight, even more preferably from 50 to 85% by weight, even more preferably from 60 to 75% by weight.

<6> The binder composition for making foundry molds according to any one of items <1> to <5>, wherein the acid-hardening resin is one or more selected from furfuryl alcohol, any condensate from furfuryl alcohol, any condensate from a phenolic compound and an aldehyde, and any condensate from furfuryl alcohol, urea and an aldehyde.

<7> The binder composition for making foundry molds according to any one of items <1> to <6>, wherein the compound (s) selected from the group consisting of urea and derivatives of urea is/are one or more selected from the group consisting of urea, alkylene ureas, alkyl ureas, cyclohexyl ureas, aryl ureas, hydroxyalkyl ureas having two or more carbon atoms in the alkyl group and azodicarbonamide, preferably one or more selected from the group consisting of urea, ethylene urea, propylene urea, butylene urea, hydantoin, methyl urea, 1,1-dimethyl urea, 1,3-dimethyl urea, cyclohexyl urea, 1,3-dicyclohexyl urea, phenyl urea, 1,1-diphenyl urea, 1,3-diphenyl urea, 2-hydroxyethyl urea, azodicarbonamide, more preferably one or more selected from the group consisting of urea and ethylene urea, even more preferably urea.

<8> The binder composition for making foundry molds according to any one of items <1> to <7>, further including 2,5-bis(hydroxymethyl)furan, the content by percentage thereof being preferably from 0.5 to 30% by weight, more preferably from 1 to 20% by weight, even more preferably from 2 to 10% by weight, even more preferably from 3 to 6% by weight.

<9> The binder composition for making foundry molds according to any one of items <1> to <8>, further including resorcin, the content by percentage thereof being preferably from 1 to 10% by weight, more preferably from 2 to 7% by weight, even more preferably from 3 to 6% by weight.

<10> The binder composition for making foundry molds according to any one of items <1> to <9>, further including water, the content by percentage thereof being preferably from 0.5 to 30% by weight, more preferably from 0.5 to 5% by weight, even more preferably from 0.6 to 3.5% by weight, even more preferably from 0.6 to 2.0% by weight.

<11> A composition for a mold, wherein the following are mixed with each other: refractory particles; the binder composition for making foundry molds recited in any one of items <1> to <10>; and a hardener for hardening the binder composition for making foundry molds.

<12> Use of the binder composition for making foundry molds recited in any one of items <1> to <11> for producing a mold.

<13> A method for producing a mold, including the step of hardening the composition for a mold recited in item <11>.

EXAMPLES

Hereinafter, a description will be made about working examples demonstrating the present invention specifically, and other embodiments. About evaluation items in the working examples and others, the following measurements were made:

<Water Content by Percentage in Binder Composition>

The water content in the binder composition was measured by a method for testing the water content in a chemical product described in JIS K 0068.

<Furfuryl Alcohol Content by Percentage in Binder Composition>

Gas chromatography was used to prepare a calibration curve of furfuryl alcohol, and the furfuryl alcohol content by percentage in the binder composition was measured.

[Measuring Conditions]
Internal standard solution: 1,6-hexanediol
Column: PEG-20M Chromosorb WAW DMCS 60/80 mesh (manufactured by GL Sciences Inc.)
Column temperature: 80 to 200° C. (8° C./rain)
Injection temperature: 210° C.
Detector temperature: 250° C.
Carrier gas: 50 mL/min (He)

Production Examples of Acid-Hardening Resins

Condensate 1

Urea-Modified Furan Resin

Into a three-necked flask were charged 100 parts by weight of furfuryl alcohol, 35 parts by weight of paraformaldehyde and 13 parts by weight of urea, and then these components were mixed with each other. The pH thereof was adjusted to 9 with a 25% solution of sodium hydroxide in water. The mixture was heated to 100° C. and then caused to react at the same temperature for 1 hour. Thereafter, the pH thereof was adjusted to 4.5 with 37% hydrochloric acid, and further the mixture was caused to react at 100° C. for 1 hour. Thereafter, the pH thereof was adjusted to 7 with a 25% solution of sodium hydroxide in water, and then 5 parts by weight of urea was added thereto to cause the mixture to react at 100° C. for 30 minutes, thus yielding a reaction product 1. An unreacted portion of furfuryl alcohol was analyzed by the above-mentioned analytical method, and a portion obtained by removing the unreacted portion of furfuryl alcohol was used as a condensate 1. About the composition of the condensate 1, the proportion of urea-modified furan resin was 89% by weight, and that of water was 11% by weight.

Condensate 2

Phenolic Resin

Into a three-necked flask were charged 100 parts by weight of phenol, and 45 parts by weight of paraformaldehyde, and then these components were mixed with each other. The pH thereof was adjusted to 8.0 with a 48% solution of potassium hydroxide in water. The mixture was caused to react at 80° C. for 10 hours to yield a condensate 2. About the composition thereof, the proportion of phenolic resin was 90% by weight, and that of water was 10% by weight.

Condensate 3

Furfuryl Alcohol Condensate

Into a three-necked flask was charged 100 parts by weight of furfuryl alcohol, and the pH thereof was adjusted to 4 with 85% phosphoric acid (manufactured by Wako Pure Chemical Industries, Ltd.). At 100° C. for 60 min, molecules of the alcohol were then caused to react to yield a reaction product 3. An unreacted portion of furfuryl alcohol was analyzed by the above-mentioned analytical method, and a portion obtained by removing the unreacted portion of furfuryl alcohol was used as a condensate 3. About the composition thereof, the proportion of a furfuryl alcohol condensate was 96% by weight, and that of water was 4% by weight.

Production Examples of Binder Compositions

The following were mixed with each other at respective predetermined proportions by weight to produce a binder composition of each of Examples 1 to 18 and Comparative Examples 1 to 16: acid-hardening resins shown in Table 1 (FFA, and the condensates 1, 2 and 3), HMF, AMF, BHMF, resorcin, urea, water, and a silane coupling agent. "FFA" denotes furfuryl alcohol; "HMF" denotes 5-hydroxymethylfurfural; "AMF" denotes 5-acetoxymethylfurfural; "BHMF" denotes 2,5-bis(hydroxymethyl)furan; and "silane coupling agent" denotes N-β-(aminoethyl)-γ-aminopropylmethyldimethoxysilane.

Examples 1 to 13, 17 and Comparative Examples 1 to 8, 13 to 15

Production Examples of Compositions for Mold

At 25° C. and 55% RH, 0.40 part by weight of hardeners (KAOLIGHTNER hardeners US-3 and C-21, the ratio by weight=22.5%/77.5%, manufactured by Kao-Quaker Co., Ltd.) was added to 100 parts by weight of silica sand

TABLE 1

| | Binder composition | | | | | | | | | | | |
|---|---|---|---|---|---|---|---|---|---|---|---|---|
| | Acid-hardening resin | | | | HMF | AMF | BHMF | Resorcin | Urea | Ethylene Urea | Water | Silane coupling agent |
| | Kind | [% by weight] | Kind | [% by weight] | [% by weight] | [% by weight] | [% by weight] | [% by weight] | [% by weight] | [% by weight] | [% bt weight] | [% by weight] |
| Example 1 | FFA | 69.05 | — | — | 30.00 | 0 | 0 | 0 | 0.80 | 0 | 0 | 0.15 |
| Example 2 | FFA | 87.95 | — | — | 10.00 | 0 | 0 | 0 | 1.90 | 0 | 0 | 0.15 |
| Example 3 | FFA | 77.95 | — | — | 20.00 | 0 | 0 | 0 | 1.90 | 0 | 0 | 0.15 |
| Example 4 | FFA | 67.95 | — | — | 30.00 | 0 | 0 | 0 | 1.90 | 0 | 0 | 0.15 |
| Example 5 | FFA | 75.95 | — | — | 20.00 | 0 | 0 | 0 | 3.90 | 0 | 0 | 0.15 |
| Example 6 | FFA | 65.95 | — | — | 30.00 | 0 | 0 | 0 | 3.90 | 0 | 0 | 0.15 |
| Example 7 | FFA | 55.95 | — | — | 40.00 | 0 | 0 | 0 | 3.90 | 0 | 0 | 0.15 |
| Example 8 | FFA | 45.95 | — | — | 50.00 | 0 | 0 | 0 | 3.90 | 0 | 0 | 0.15 |
| Example 9 | FFA | 51.84 | Condensate 1 | 16.11 | 30.00 | 0 | 0 | 0 | 1.90 | 0 | 0 | 0.15 |
| Example 10 | FFA | 51.95 | Condensate 2 | 16.00 | 30.00 | 0 | 0 | 0 | 1.90 | 0 | 0 | 0.15 |
| Example 11 | FFA | 50.35 | Condensate 3 | 17.60 | 30.00 | 0 | 0 | 0 | 1.90 | 0 | 0 | 0.15 |
| Example 12 | FFA | 60.95 | — | — | 30.00 | 0 | 5.00 | 0 | 3.90 | 0 | 0 | 0.15 |
| Example 13 | FFA | 70.95 | — | — | 20.00 | 0 | 0 | 5.00 | 3.90 | 0 | 0 | 0.15 |
| Example 14 | FFA | 64.95 | — | — | 30.00 | 0 | 0 | 0 | 3.90 | 0 | 1.00 | 0.15 |
| Example 15 | FFA | 61.15 | — | — | 30.00 | 0 | 0 | 0 | 7.70 | 0 | 1.00 | 0.15 |
| Example 16 | FFA | 64.95 | — | — | 0 | 30.00 | 0 | 0 | 3.90 | 0 | 1.00 | 0.15 |
| Example 17 | FFA | 65.95 | — | — | 30.00 | 0 | 0 | 0 | 0.00 | 3.90 | 0 | 0.15 |
| Example 18 | FFA | 64.95 | — | — | 30.00 | 0 | 0 | 0 | 0.00 | 3.90 | 1.00 | 0.15 |
| Comparative Example 1 | FFA | 99.85 | — | — | 0 | 0 | 0 | 0 | 0 | 0 | 0 | 0.15 |
| Comparative Example 2 | FFA | 89.85 | — | — | 10.00 | 0 | 0 | 0 | 0 | 0 | 0 | 0.15 |
| Comparative Example 3 | FFA | 79.85 | — | — | 20.00 | 0 | 0 | 0 | 0 | 0 | 0 | 0.15 |
| Comparative Example 4 | FFA | 69.85 | — | — | 30.00 | 0 | 0 | 0 | 0 | 0 | 0 | 0.15 |
| Comparative Example 5 | FFA | 59.85 | — | — | 40.00 | 0 | 0 | 0 | 0 | 0 | 0 | 0.15 |
| Comparative Example 6 | FFA | 99.05 | — | — | 0 | 0 | 0 | 0 | 0.80 | 0 | 0 | 0.15 |
| Comparative Example 7 | FFA | 97.95 | — | — | 0 | 0 | 0 | 0 | 1.90 | 0 | 0 | 0.15 |
| Comparative Example 8 | FFA | 95.95 | — | — | 0 | 0 | 0 | 0 | 3.90 | 0 | 0 | 0.15 |
| Comparative Example 9 | FFA | 98.85 | — | — | 0 | 0 | 0 | 0 | 0 | 0 | 1.00 | 0.15 |
| Comparative Example 10 | FFA | 68.85 | — | — | 30.00 | 0 | 0 | 0 | 0 | 0 | 1.00 | 0.15 |
| Comparative Example 11 | FFA | 94.95 | — | — | 0 | 0 | 0 | 0 | 3.90 | 0 | 1.00 | 0.15 |
| Comparative Example 12 | FFA | 91.15 | — | — | 0 | 0 | 0 | 0 | 7.70 | 0 | 1.00 | 0.15 |
| Comparative Example 13 | FFA | 25.95 | — | — | 70.00 | 0 | 0 | 0 | 3.90 | 0 | 0 | 0.15 |
| Comparative Example 14 | FFA | 29.85 | — | — | 70.00 | 0 | 0 | 0 | 0 | 0 | 0 | 0.15 |
| Comparative Example 15 | FFA | 95.95 | — | — | 0 | 0 | 0 | 0 | 0 | 3.90 | 0 | 0.15 |
| Comparative Example 16 | FFA | 95.95 | — | — | 0 | 0 | 0 | 0 | 0 | 3.90 | 1.00 | 0.15 |

Condensate 1: 89% by weight of urea-modified furan resin, and 11% by weight of water
Condensate 2: 90% by weight of phenolic resin, and 10% by weight of water
Condensate 3: 96% by weight of furfuryl alcohol condensate, and 4% by weight of water
Silane coupling agent: N-β-(aminoethyl)-γ-aminopropylmethyldimethoxysilane (Fremantle new sand). Next, thereto was added 1.00 part by weight of the binder composition of each of Examples 1 to 13, 17 and Comparative Examples 1 to 8, 13 to 15. These components were mixed with each other to yield each composition for a mold (kneaded sand composition).

Test Example 1

Respective Hardening Rates and Respective Final Strengths

Each of the kneaded sand composition just after the kneading was filled into each of columnar test pieces pattern having a diameter of 50 mm and a height of 50 mm. After 0.5, 1 and 2 hours, from the patterns, respectively, the test piece was stripped. The respective compression strengths (MPa) of the test pieces were measured in accordance with a method described in JIS Z 2604-1976. It is demonstrated that as a test piece had a higher "compression strength after the one hour" among these test pieces, the test piece had a larger hardening rate. Each of the kneaded sand composition that was filled into a test piece pattern formed separately in the same way was stripped from the pattern after 3 hours elapsed. About the test piece, the compression strength (MPa) thereof was measured after 24 hours from the filling time in accordance with the method described in JIS Z 2604-1976. The measured value was defined as the "compression strength after 24 hours". It is demonstrated that as the numerical value thereof was higher, the mold-strength was higher. The results are shown in Tables 2 to 6.

TABLE 2

| | Binder composition | | | | Compression strength | | | |
|---|---|---|---|---|---|---|---|---|
| | Acid-hardening resin | HMF | Urea | Silane coupling agent | | | | |
| | Kind | [% by weight] | [% by weight] | [% by weight] | [% by weight] | 0.5 hr [MPa] | 1 hr [MPa] | 2 hr [MPa] | 24 hr [MPa] |
| Example 1 | FFA | 69.05 | 30.00 | 0.80 | 0.15 | 0.22 | 1.32 | — | 4.57 |
| Comparative Example 1 | FFA | 99.85 | 0 | 0 | 0.15 | 0 | 0.23 | 1.07 | 3.20 |
| Comparative Example 4 | FFA | 69.85 | 30.00 | 0 | 0.15 | 0 | 0.54 | 1.49 | 4.32 |
| Comparative Example 6 | FFA | 99.05 | 0 | 0.80 | 0.15 | 0 | 0.06 | 0.80 | 3.29 |

For 100 parts by weight of Fremantle new sand, 1.0 part by weight of binder composition, and 0.4 part by weight of hardeners (US-3 and C-21 (=22.5%/77.5%) were used.
Silane coupling agent: N-β-(aminoethyl)-γ-aminopropylmethyldimethoxysilane

TABLE 3

| | Binder composition | | | | Compression strength | | | |
|---|---|---|---|---|---|---|---|---|
| | Acid-hardening resin | HMF | Urea | Silane coupling agent | | | | |
| | Kind | [% by weight] | [% by weight] | [% by weight] | [% by weight] | 0.5 hr [MPa] | 1 hr [MPa] | 2 hr [MPa] | 24 hr [MPa] |
| Comparative Example 1 | FFA | 99.85 | 0 | 0 | 0.15 | 0 | 0.23 | 1.07 | 3.20 |
| Comparative Example 7 | FFA | 97.95 | 0 | 1.90 | 0.15 | 0 | 0 | 0.62 | 3.35 |
| Example 2 | FFA | 87.95 | 10.00 | 1.90 | 0.15 | 0 | 0.57 | 2.12 | 4.72 |
| Comparative Example 2 | FFA | 89.85 | 10.00 | 0 | 0.15 | 0 | 0.46 | 1.43 | 3.92 |
| Example 3 | FFA | 77.95 | 20.00 | 1.90 | 0.15 | 0.05 | 1.88 | — | 5.13 |
| Comparative Example 3 | FFA | 79.85 | 20.00 | 0 | 0.15 | 0 | 0.48 | 1.66 | 4.37 |
| Example 4 | FFA | 67.95 | 30.00 | 1.90 | 0.15 | 0.46 | 2.63 | — | 4.48 |
| Comparative Example 4 | FFA | 69.85 | 30.00 | 0 | 0.15 | 0 | 0.54 | 1.49 | 4.32 |

For 100 parts by weight of Fremantle new sand, 1.0 part by weight of binder composition, and 0.4 part by weight of hardeners (US-3 and C-21 (=22.5%/77.5%) were used.
Silane coupling agent: N-β-(aminoethyl)-γ-aminopropylmethyldimethoxysilane

TABLE 4

| | Binder composition | | | | | | Compression strength | | | |
|---|---|---|---|---|---|---|---|---|---|---|
| | Acid-hardening resin | | HMF | Urea | Ethylene Urea | Silane coupling agent | | | | |
| | Kind | [% by weight] | [% by weight] | [% by weight] | [% by weight] | [% by weight] | 0.5 hr [MPa] | 1 hr [MPa] | 2 hr [MPa] | 24 hr [MPa] |
| Comparative Example 1 | FFA | 99.85 | 0 | 0 | 0 | 0.15 | 0 | 0.23 | 1.07 | 3.20 |
| Comparative Example 8 | FFA | 95.95 | 0 | 3.90 | 0 | 0.15 | 0 | 0 | 0.40 | 3.62 |
| Comparative Example 15 | FFA | 95.95 | 0 | 0 | 3.90 | 0.15 | 0 | 0.14 | 0.84 | 3.76 |
| Example 5 | FFA | 75.95 | 20.00 | 3.90 | 0 | 0.15 | 0 | 0.51 | 3.07 | 4.63 |
| Comparative Example 3 | FFA | 79.85 | 20.00 | 0 | 0 | 0.15 | 0 | 0.48 | 1.66 | 4.37 |
| Example 6 | FFA | 65.95 | 30.00 | 3.90 | 0 | 0.15 | 0.20 | 2.45 | — | 4.73 |
| Example 17 | FFA | 65.95 | 30.00 | 0 | 3.90 | 0.15 | 1.38 | 2.93 | — | 4.61 |
| Comparative Example 4 | FFA | 69.85 | 30.00 | 0 | 0 | 0.15 | 0 | 0.54 | 1.49 | 4.32 |
| Example 7 | FFA | 55.95 | 40.00 | 3.90 | 0 | 0.15 | 0.75 | 2.69 | — | 4.65 |
| Comparative Example 5 | FFA | 59.85 | 40.00 | 0 | 0 | 0.15 | 0 | 0.21 | 0.66 | 3.89 |
| Example 8 | FFA | 45.95 | 50.00 | 3.90 | 0 | 0.15 | 0.97 | 2.22 | — | 3.44 |
| Comparative Example 13 | FFA | 25.95 | 70.00 | 3.90 | 0 | 0.15 | 0.24 | 0.45 | 0.68 | 1.66 |
| Comparative Example 14 | FFA | 29.85 | 70.00 | 0 | 0 | 0.15 | 0 | 0 | 0 | 0.29 |

For 100 parts by weight of Fremantle new sand, 1.0 part by weight of binder composition, and 0.4 part by weight of hardeners (US-3 and C-21 (=22.5%/77.5%) were used.
Silane coupling agent: N-β-(aminoethyl)-γ-aminopropylmethyldimethoxysilane

TABLE 5

| | Binder composition | | | | | | | Compression strength | | | |
|---|---|---|---|---|---|---|---|---|---|---|---|
| | Acid-hardening resin | | | | HMF | Urea | Silane coupling agent | | | | |
| | Kind | [% by weight] | Kind | [% by weight] | [% by weight] | [% by weight] | [% by weight] | 0.5 hr [MPa] | 1 hr [MPa] | 2 hr [MPa] | 24 hr [MPa] |
| Example 4 | FFA | 67.95 | — | — | 30.00 | 1.90 | 0.15 | 0.46 | 2.63 | — | 4.48 |
| Example 9 | FFA | 51.84 | Condensate 1 | 16.11 | 30.00 | 1.90 | 0.15 | 0.56 | 2.56 | — | 4.74 |
| Example 10 | FFA | 51.95 | Condensate 2 | 16.00 | 30.00 | 1.90 | 0.15 | 0.82 | 2.34 | — | 4.26 |
| Example 11 | FFA | 50.35 | Condensate 3 | 17.60 | 30.00 | 1.90 | 0.15 | 0.70 | 2.70 | — | 4.81 |
| Comparative Example 7 | FFA | 97.95 | — | — | 0 | 1.90 | 0.15 | 0 | 0 | 0.62 | 3.35 |

For 100 parts by weight of Fremantle new sand, 1.0 part by weight of binder composition, and 0.4 part by weight of hardeners (US-3 and C-21 (=22.5%/77.5%) were used.
Condensate 1: 89% by weight of urea-modified furan resin, and 11% by weight of water
Condensate 2: 90% by weight of phenolic resin, and 10% by weight of water
Condensate 3: 96% by weight of furfuryl alcohol condensate, and 4% by weight of water
Silane coupling agent: N-β-(aminoethyl)-γ-aminopropylmethyldimethoxysilane

TABLE 6

| | Binder composition | | | | | | | Compression strength | | | |
|---|---|---|---|---|---|---|---|---|---|---|---|
| | Acid-hardening resin | | HMF | BHMF | Resorcin | Urea | Silane coupling agent | | | | |
| | Kind | [% by weight] | [% by weight] | [% by weight] | [% by weight] | [% by weight] | [% by weight] | 0.5 hr [MPa] | 1 hr [MPa] | 2 hr [MPa] | 24 hr [MPa] |
| Example 6 | FFA | 65.95 | 30.00 | 0 | 0 | 3.90 | 0.15 | 0.20 | 2.45 | — | 4.73 |
| Example 12 | FFA | 60.95 | 30.00 | 5.00 | 0 | 3.90 | 0.15 | 0.50 | 2.68 | — | 4.22 |
| Example 13 | FFA | 70.95 | 20.00 | 0 | 5.00 | 3.90 | 0.15 | 0.74 | 2.42 | — | 3.89 |
| Comparative Example 8 | FFA | 95.95 | 0 | 0 | 0 | 3.90 | 0.15 | 0 | 0 | 0.40 | 3.62 |

For 100 parts by weight of Fremantle new sand, 1.0 part by weight of binder composition, and 0.4 part by weight of hardeners (US-3 and C-21 (=22.5%/77.5%) were used.
Silane coupling agent: N-β-(aminoethyl)-γ-aminopropylmethyldimethoxysilane It is understood from the results in Tables 2 to 6 that among the binder compositions, those of Examples 1 to 13, which contained 5-hydroxymethylfurfural and urea, and the binder composition of Example 17, which contained 5-hydroxymethylfurfural and ethylene urea had a high hardening rate and also a high mold-strength than those of Comparative Examples 1 to 8, which contained none of the two, or just either one thereof, or than that of Comparative Example 13, which contained urea but had a higher content by percentage of 5-hydroxymethylfurfural, or than that of Comparative Example 15, which contained ethylene urea but had zero content by percentage of 5-hydroxymethylfurfural.

Production Examples of Hardener

The ratio between the KAOLIGHTNER hardeners US-3 and C-21 manufactured by Kao-Quaker Co., Ltd. was adjusted to each ratio shown in Table 7 and Table 8 to set the hardening rate to about 0.3 [MPa] in a period of 0.5 hour.

Production Examples of Compositions for Mold

Examples 14 to 16 and Comparative Examples 9 to 12

At 25° C. and 55% RH, 0.40 part by weight of the hardener was added to 100 parts by weight of silica sand (Fremantle new sand). Next, thereto was added 1.00 part by weight of the binder composition of each of Examples 14 to 16, and Comparative Examples 9 to 12. These components were mixed with each other to yield each kneaded sand composition shown in Table 7.

Examples 18 and Comparative Examples 9, 10, 16

At 25° C. and 55% RH, 0.40 part by weight of the hardener was added to 100 parts by weight of silica sand (Fremantle new sand). Next, thereto was added 1.00 part by weight of the binder composition of each of Examples 18, and Comparative Examples 9, 10, 16. These components were mixed with each other to yield each kneaded sand composition shown in Table 8.

Test Example 2

Respective Hardening Rates and Respective Final Strengths

Each of the kneaded sand composition, just after the kneading, was filled into each columnar test piece pattern having a diameter of 50 mm and a height of 50 mm. After 0.5 hour and 1 hour, the test pieces were stripped from the pattern, respectively. The respective compression strengths (MPa) of the test pieces were measured in accordance with the method described in JIS Z 2604-1976. For each test piece, the "compression strength after 24 hours" was also measured on the basis of the method described in JIS Z 2604-1976.

Test Example 3

Formaldehyde-Generation-Amount Measuring Method

At 25° C. and 55% RH, in a mixer (closed system of 7.0 L in volume), 8.0 g of hardeners (the ratio between KAOLIGHTNER hardeners US-3 and C-21 manufactured by Kao-Quaker Co., Ltd. was adjusted to a ratio described in Table 4 to set the hardening rate to about 0.3 [MPa] in a period of 0.5 hour) were added to 2.0 kg of silica sand (Fremantle new sand). Next, thereto was added 20 g of a binder composition having each composition shown in Table 4, and these components were mixed with each other. At this time, air was caused to flow thereinto (3.0 L/min) over 8 minutes from the binder-composition-added time, and formaldehyde generated from the kneaded sand composition was collected into distilled water to yield a sample. Next, by high-performance liquid chromatography using the acetylacetone method, the formaldehyde amount in the sample was measured. The results are shown in Tables 7 and 8.

[Measuring Conditions]

Column: L-column ODS

Mobile phase: distilled water

Mobile phase flow rate: 1.0 mL/min

Column temperature: 25° C.

Reaction liquid: 150 g of ammonium acetate, 3 mL of acetic acid, and 5 mL of acetylacetone were dissolved in 1000 mL of distilled water Reaction liquid flow rate: 0.5 mL/min Reaction temperature: 80° C.

Detection: fluorescence detection, excitation wavelength: 395 nm, detection wavelength: 545 nm

TABLE 7

| | Binder composition | | | | | | | Hardeners | | Compression strength | | | Formaldehyde generation amount |
|---|---|---|---|---|---|---|---|---|---|---|---|---|---|
| | Acid-hardening resin | | 5-Hydroxy-methyl-furfural | 5-Acetoxy-methyl-furfural | Urea | Water | Silane coupling agent | | | | | | |
| | Kind | [% by weight] | [% by weight] | [% by weight] | [% by weight] | [% by weight] | [% by weight] | Kind | parts by weight | 0.5 hr [MPa] | 1 hr [MPa] | 24 hr [MPa] | [ppm/gram of resin] |
| Example 14 | FFA | 64.95 | 30.00 | 0 | 3.90 | 1.00 | 0.15 | US-3/C-21 | 0.09/0.31 | 0.20 | 2.45 | 4.73 | 4.2 |
| Example 15 | FFA | 61.15 | 30.00 | 0 | 7.70 | 1.00 | 0.15 | US-3/C-21 | 0.16/0.24 | 0.27 | 2.16 | 4.26 | 3.1 |
| Example 16 | FFA | 64.95 | 0 | 30.00 | 3.90 | 1.00 | 0.15 | US-3/C-21 | 0.16/0.24 | 0.29 | 1.47 | 4.48 | 4.4 |
| Comparative Example 9 | FFA | 98.85 | 0 | 0 | 0 | 1.00 | 0.15 | US-3/C-21 | 0.16/0.24 | 0.32 | 1.06 | 3.67 | 18.1 |
| Comparative Example 10 | FFA | 98.85 | 30.00 | 0 | 0 | 1.00 | 0.15 | US-3/C-21 | 0.16/0.24 | 0.22 | 0.92 | 2.00 | 23.5 |
| Comparative Example 11 | FFA | 94.95 | 0 | 0 | 3.90 | 1.00 | 0.15 | US-3/C-21 | 0.22/0.18 | 0.26 | 0.74 | 3.45 | 12.8 |

TABLE 7-continued

| | Binder composition | | | | | | | | Compression strength | | | Formaldehyde generation amount |
|---|---|---|---|---|---|---|---|---|---|---|---|---|
| | Acid-hardening resin | 5-Hydroxy-methyl-furfural | 5-Acetoxy-methyl-furfural | Urea | Water | Silane coupling agent | Hardeners | | | | | |
| Kind | [% by weight] | [% by weight] | [% by weight] | [% by weight] | [% by weight] | [% by weight] | Kind | parts by weight | 0.5 hr [MPa] | 1 hr [MPa] | 24 hr [MPa] | [ppm/gram of resin] |
| Comparative Example 12 | FFA | 91.15 | 0 | 0 | 7.70 | 1.00 | 0.15 | US-3/C-21 | 0.30/0.10 | 0.26 | 0.63 | 2.56 | 11.5 |

For 100 parts by weight of Fremantle new sand, 1.0 part by weight of binder composition, and 0.4 part by weight of hardeners were used.
Silane coupling agent: N-β-(aminoethyl)-γ-aminopropylmethyldimethoxysilane It is understood from Table 7 that Comparative Example 10, which contained only 5-hydroxymethylfurfural, generated a larger amount of formaldehyde, and had a worse hardening rate and mold-strength than in Comparative Example 9, which contained neither 5-hydroxymethylfurfural nor urea. It is also understood that in Comparative Examples 11 and 12, which contained only urea, the hardening rate and the mold-strength was worse than in Comparative Example 9 although the amount of formaldehyde generated was slightly less.

By contrast, it is understood that in Examples 14 and 15, which contained both 5-hydroxymethylfurfural and urea, the amount of formaldehyde generated was remarkably less and further the hardening rate and the mold-strength were improved with a good balance contrary to a tendency expected from the results of Comparative Examples 10 to 12. It is also understood that in Example 16, wherein 5-acetoxymethylfurfural was used instead of 5-hydroxymethylfurfural in Example 14, the amount of formaldehyde generated was remarkably less and further the hardening rate and the mold-strength were also better than in Comparative Examples 10 to 12.

By contrast, it is understood that in Example 18, which contained both 5-hydroxymethylfurfural and ethylene urea, the amount of formaldehyde generated remarkably decreased and further the hardening rate and the mold-strength were improved with a good balance contrary to a tendency expected from the results of Comparative Examples 9, 10, 16.

The invention claimed is:

1. A binder composition for making foundry molds, comprising:
   an acid-hardening resin;
   one or more 5-position-substituted-furfural compounds selected from the group consisting of 5-hydroxymethylfurfural and 5-acetoxymethylfurfural; and
   one or more compounds selected from the group consisting of urea, alkylene ureas, alkyl ureas, cyclohexyl ureas, aryl ureas, hydroxyalkyl ureas having two or more carbon atoms in the alkyl group, and azodicarbonamide, wherein
   the content of the 5-position-substituted-furfural compound(s) is from 10 to 50% by weight of the binder composition,

TABLE 8

| | Binder composition | | | | | | | | Compression strength | | | Formaldehyde generation amount |
|---|---|---|---|---|---|---|---|---|---|---|---|---|
| | Acid-hardening resin | 5-Hydroxy methyl furfural | Ethylene Urea | Water | Silane coupling agent | Hardeners | | | | | | |
| Kind | [% by weight] | [% by weight] | [% by weight] | [% by weight] | [% by weight] | Kind | parts by weight | 0.5 hr [MPa] | 1 hr [MPa] | 24 hr [MPa] | [ppm/gram of resin] |
| Example 18 | FFA | 64.95 | 30.00 | 3.90 | 1.00 | 0.15 | US-3/C-21 | 0.04/0.36 | 0.29 | 1.43 | 3.96 | 1.1 |
| Comparative Example 9 | FFA | 98.85 | 0 | 0 | 1.00 | 0.15 | US-3/C-21 | 0.16/0.24 | 0.32 | 1.06 | 3.67 | 18.1 |
| Comparative Example 10 | FFA | 68.85 | 30.00 | 0 | 1.00 | 0.15 | US-3/C-21 | 0.16/0.24 | 0.22 | 0.92 | 2.00 | 23.5 |
| Comparative Example 16 | FFA | 94.95 | 0 | 3.90 | 1.00 | 0.15 | US-3/C-21 | 0.18/0.22 | 0.38 | 1.03 | 3.86 | 2.8 |

For 100 parts by weight of Fremantle new sand, 1.0 part by weight of binder composition, and 0.4 part by weight of hardeners were used.
Silane coupling agent: N-β-(aminoethyl)-γ-aminopropylmethyldimethoxysilane It is understood from Table 8 that Comparative Example 10, which contained only 5-hydroxymethylfurfural, generated a larger amount of formaldehyde, and had a worse hardening rate and mold-strength than in Comparative Example 9, which contained neither 5-hydroxymethylfurfural nor ethylene urea. It is also understood that in Comparative Example 16, which contained only ethylene urea, the mold-strength was slightly better but the hardening rate was worse than in Comparative Example 9 although the amount of formaldehyde generated was less.

the content of the compound(s) selected from the group consisting of urea, alkylene ureas, alkyl ureas, cyclohexyl ureas, aryl ureas, hydroxyalkyl ureas having two or more carbon atoms in the alkyl group, and azodicarbonamide is from 1 to 8% by weight of the binder composition, and
the binder composition further comprises water.

2. The binder composition for making foundry molds according to claim 1, wherein the ratio by weight of the 5-position-substituted-furfural compound(s) to the compound(s) selected from the group consisting of urea, alkylene ureas, alkyl ureas, cyclohexyl ureas, aryl ureas, hydroxyalkyl ureas having two or more carbon atoms in the alkyl group, and azodicarbonamide is from 3 to 40.

3. The binder composition for making foundry molds according to claim 1, wherein the content of the acid-hardening resin by percentage is from 10 to 98% by weight of the binder composition.

4. The binder composition for making foundry molds according to claim 1, wherein the acid-hardening resin is one or more selected from the group consisting of furfuryl alcohol, any condensate from furfuryl alcohol, any condensate from a phenolic compound and an aldehyde, and any condensate from furfuryl alcohol, urea and an aldehyde.

5. The binder composition for making foundry molds according to claim 1, wherein the compound(s) selected from the group consisting of urea, alkylene ureas, alkyl ureas, cyclohexyl ureas, aryl ureas, hydroxyalkyl ureas having two or more carbon atoms in the alkyl group, and azodicarbonamide is one or more selected from the group consisting of alkylene ureas and alkyl ureas.

6. The binder composition for making foundry molds according to claim 1, wherein the compound(s) selected from the group consisting of urea, alkylene ureas, alkyl ureas, cyclohexyl ureas, aryl ureas, hydroxyalkyl ureas having two or more carbon atoms in the alkyl group, and azodicarbonamide is one or more selected from the group consisting of urea and ethylene urea.

7. The binder composition for making foundry molds according to claim 1, further comprising 2,5-bis(hydroxymethyl)furan.

8. The binder composition for making foundry molds according to claim 7, wherein the content of 2,5-bis(hydroxymethyl)furan by percentage is from 0.5 to 30% by weight of the binder composition.

9. The binder composition for making foundry molds according to claim 1, further comprising resorcin.

10. The binder composition for making foundry molds according to claim 9, wherein the content of resorcin by percentage is from 1 to 10% by weight of the binder composition.

11. The binder composition for making foundry molds according to claim 1, wherein the content of water by percentage is from 0.5 to 30% by weight of the binder composition.

12. A composition for a mold, wherein the following are mixed with each other: refractory particles; the binder composition for making foundry molds recited in claim 1; and a hardener for hardening the binder composition for making foundry molds.

13. A method for producing a mold, comprising the step of hardening the composition for a mold recited in claim 12.

14. A binder composition for making foundry molds, comprising:
an acid-hardening resin, one or more 5-position-substituted-furfural compounds selected from the group consisting of 5-hydroxymethylfurfural and 5-acetoxymethylfurfural, and
one or more compounds selected from the group consisting of alkylene ureas and alkyl ureas, wherein
the content of the 5-position-substituted-furfural compound(s) is from 1 to 60% by weight of the binder composition.

* * * * *